(No Model.) 2 Sheets—Sheet 2.
J. W. HYATT.
CHECK VALVE FOR FILTER CONSTRUCTIONS.
No. 405,670. Patented June 18, 1889.
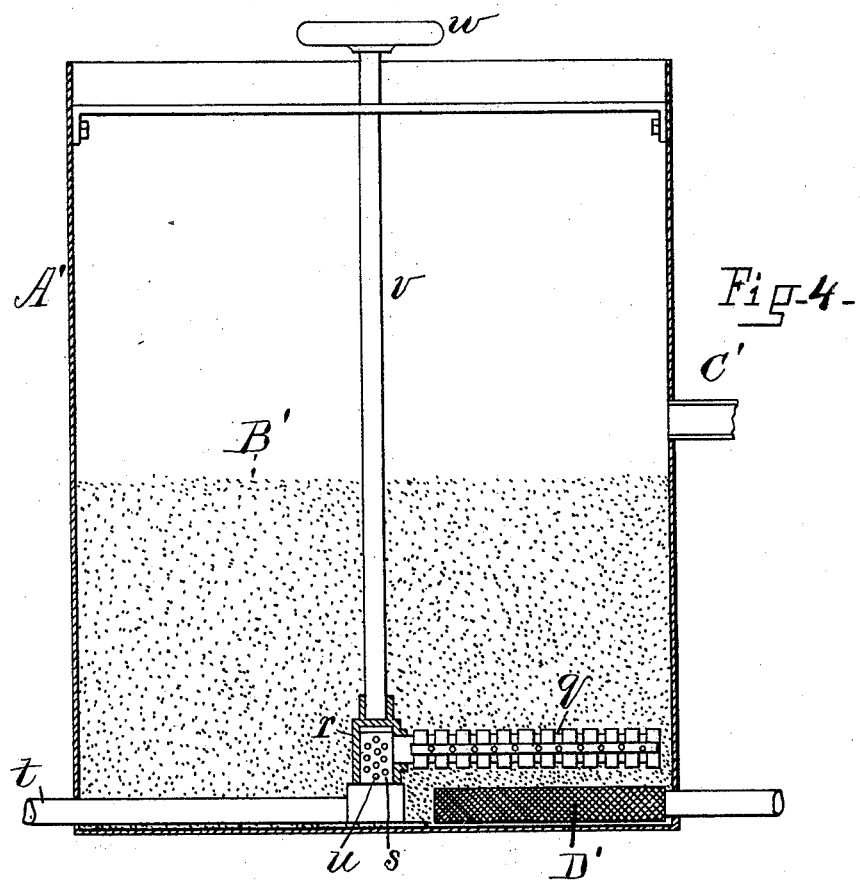
Attest:
L. Lee.
F. C. Fischer.
Inventor:
John W. Hyatt per
Crane & Miller, Attys

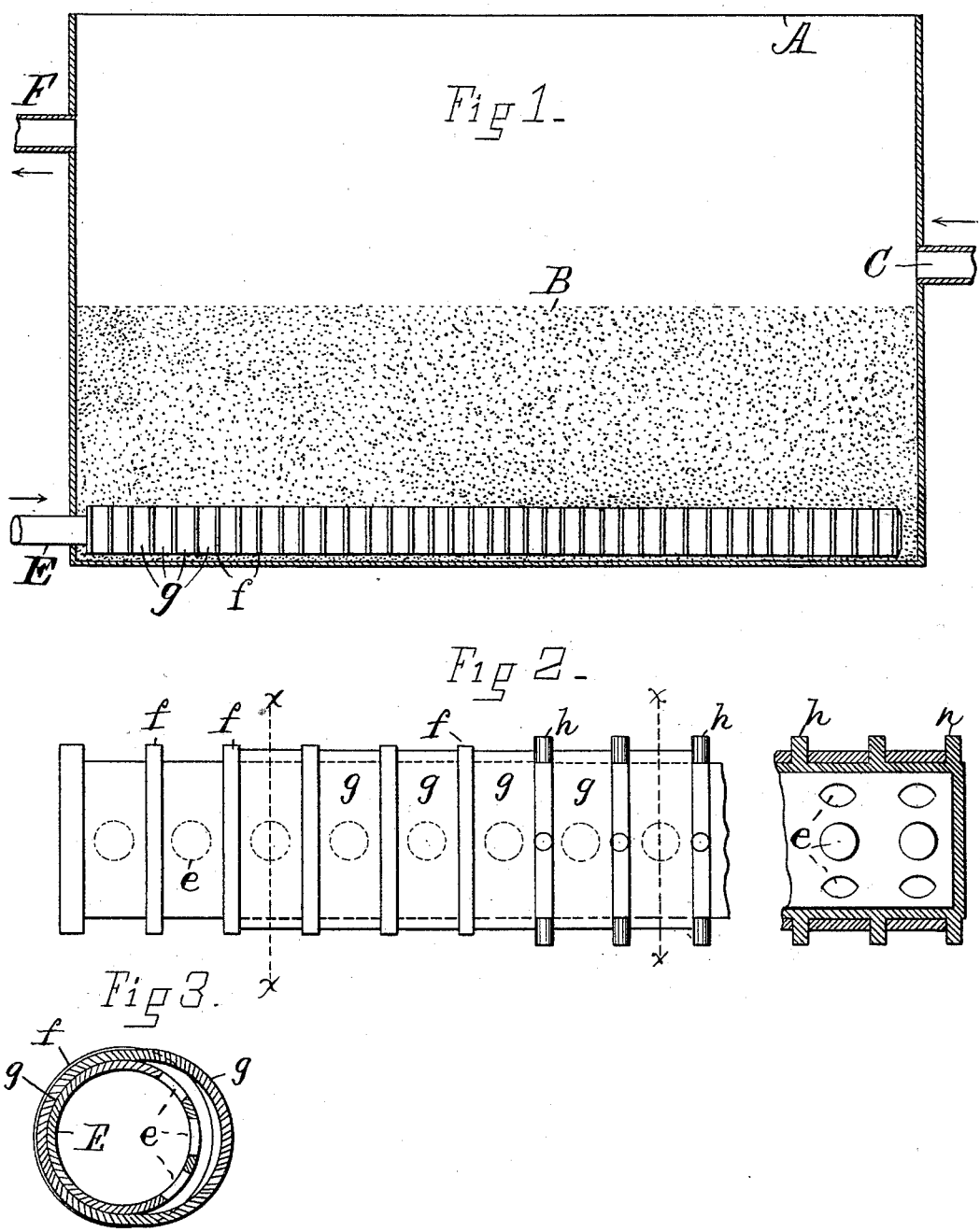

UNITED STATES PATENT OFFICE.

JOHN W. HYATT, OF NEWARK, NEW JERSEY, ASSIGNOR TO THE HYATT PURE WATER COMPANY, OF NEW JERSEY.

CHECK-VALVE FOR FILTER CONSTRUCTIONS.

SPECIFICATION forming part of Letters Patent No. 405,670, dated June 18, 1889.

Application filed February 28, 1888. Serial No. 265,558. (No model.)

*To all whom it may concern:*

Be it known that I, JOHN W. HYATT, a citizen of the United States, residing at Newark, Essex county, New Jersey, have invented certain new and useful Improvements in Check-Valves for Filter Constructions, fully described and represented in the following specification, and the accompanying drawings, forming a part of the same.

This invention relates to an inlet-pipe for filters containing loose granular material, in which the pipe requires provision for excluding the granular material from the apertures formed therein to admit the water.

The invention consists in a pipe provided at intervals with rows of holes extending around the pipe, and a separate rubber band applied over each row of holes and arranged to yield freely at the opposite sides of such holes to form passages for the fluid at both edges of the band.

The invention will be understood by reference to the annexed drawings, in which—

Figure 1 is an elevation in section of a filter-casing with a filter-bed inside the same and an inlet-pipe provided with my improvements. Fig. 2 is an enlarged view of the inlet-pipe detached from the filter-casing. Fig. 3 is a section of the same on line $x$ $x$ in Fig. 2. Fig. 4 shows the invention in the washer-arm of a filter.

In Fig. 1, A is the filter-casing, B the filter-bed of granular material within the same, C an inlet-pipe for the unfiltered water, and D an outlet-strainer below the filter-bed to receive and discharge the water which filters through the same.

E is an inlet-pipe, shown inserted beneath a portion of the bed to introduce a reversed current of water to wash the impurities from the bed, the latter being discharged with such fluid from the upper part of the casing by an overflow-pipe F. In a filter the pipes would be provided with suitable cocks, which are not shown, as they form no part of my present invention.

The pipe E is shown upon a larger scale in Fig. 2, the part near the closed end of the pipe being shown in section to expose the holes $e$ upon its opposite side.

$f$ are annular collars formed upon the pipe adjacent to the sides of such holes to guide the endless rubber bands $g$, which are stretched over the collars and fit snugly upon the pipe between the same to close the holes.

In Figs. 3 and 4 the operation of the rubber band as a valve is clearly shown, the hole $e$ being shown in section with the band $g$ pushed away from the same, as happens when the inlet fluid is forced into the pipe.

When an inlet-pipe is inserted in a bed of granular material, as in Fig. 1, the sand is liable to enter the inlet-holes unless provided with check-valves, and to become packed within the pipes, so that the subsequent flow of water will not dislodge it. The yielding character of the india-rubber enables it to fit closely upon the pipe about the inlet-hole, and thus wholly excludes the sand therefrom, as the elasticity of the india-rubber causes it to press tightly upon the holes as soon as the water-supply is cut off, and the pressure within the pipe diminished in such degree that the sand might enter.

At $h$, in Figs. 2 and 4, pins are shown projected from the pipe in place of the collars $f$, and are made of suitable length to permit the expansion of the elastic band and to guide the same back to its place over the hole $e$.

Where a large discharge is required from a small pipe, the holes would require to be formed upon all sides thereof, and in such case the pins would not form so great an obstruction as the collars to the escape of the water from the holes beneath the band.

Fig. 4 shows the invention applied to the revolving washer-arm of the filter, A' being the filter-casing; B', the bed of sand therein; C', the water-inlet; D', one of the outlet strainer-pipes, and $q$ a washer-arm and secured to a revolving hub $r$ adapted to receive a current of water from a sleeve $s$, which is supplied with a reverse current of water, when washing, through a pipe $t$. The hub is shown in section to show perforations $u$ in the sleeve, and the hub is provided with a shaft $v$ and a hand-wheel $w$ to rotate the washer-arm within the bed, so as to disintegrate all portions of the same during the washing operation. When the water is cut off from such washer-arm at the close of the washing operation, the washer-arm would become filled with sand, which could not afterward be readily dislodged if large perforations for the free vent of the water were formed therein and unprovided with means to exclude the sand. The rubber bands therefore serve most effectively to protect the perforations e when the water-current is cut off, and to thus maintain the pipe or arm in an efficient condition.

I am aware of British Patent No. 323 of 1861, which shows a pipe having several rows of holes extending around the same and having a single india-rubber band to cover such holes, the band being secured upon the pipe around the entire periphery at one of its edges, and the course of the water is from one side only of each hole, and the discharge is effected at one edge only of the band. My invention differs from such construction in having a separate rubber band for each row of holes in the pipe, the band being attached (if at all) at only one point in its periphery. By making the band narrow and allowing both its edges to remain free the course of the water in issuing from the holes in the pipe is but slightly diverted, and as the same is allowed to flow on both sides of the band a double outlet is thus afforded to the water, and the obstruction thereto, when the holes are uncovered, is much less than in the construction above referred to. I hereby disclaim the construction shown in the said British patent.

Having thus set forth my invention, what I claim herein is—

The combination, with a filter containing loose granular material, of an inlet-pipe buried in such granular material and provided at intervals with rows of holes extending transversely around the pipe, and a separate rubber band of suitable width to cover a single row of holes applied over each row and arranged to yield freely at the opposite sides of such holes to form a passage for the fluid at both edges of the band, the whole arranged and operated as and for the purpose set forth.

In testimony whereof I have hereunto set my hand in the presence of two subscribing witnesses.

JOHN W. HYATT.

Witnesses:
FRANK L. MOUTON,
THOS. S. CRANE.